US012595046B2

(12) United States Patent
Tada et al.

(10) Patent No.: US 12,595,046 B2
(45) Date of Patent: Apr. 7, 2026

(54) LANDING GEAR FOR AIRCRAFT

(71) Applicant: SUMITOMO PRECISION PRODUCTS CO., LTD., Hyogo (JP)

(72) Inventors: Kazunari Tada, Hyogo (JP); Shinnosuke Masamura, Hyogo (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 31 days.

(21) Appl. No.: 18/729,446

(22) PCT Filed: Oct. 31, 2022

(86) PCT No.: PCT/JP2022/040640
§ 371 (c)(1),
(2) Date: Jul. 16, 2024

(87) PCT Pub. No.: WO2023/139884
PCT Pub. Date: Jul. 27, 2023

(65) Prior Publication Data
US 2025/0115353 A1 Apr. 10, 2025

(30) Foreign Application Priority Data

Jan. 18, 2022 (JP) ................................. 2022-005487

(51) Int. Cl.
*B64C 25/34* (2006.01)
*B64C 25/32* (2006.01)
*B64C 25/62* (2006.01)

(52) U.S. Cl.
CPC .............. *B64C 25/62* (2013.01); *B64C 25/34* (2013.01); *B64C 25/405* (2013.01)

(58) Field of Classification Search
CPC ........ B64C 25/34; B64C 25/62; B64C 25/405
See application file for complete search history.

(56) References Cited

U.S. PATENT DOCUMENTS

| | | | | |
|---|---|---|---|---|
| 2007/0241230 A1* | 10/2007 | Bucheton | ................ | B64C 25/50 |
| | | | | 244/104 R |
| 2009/0294578 A1* | 12/2009 | Humphrey | ............ | B64C 25/505 |
| | | | | 244/50 |
| 2013/0015290 A1* | 1/2013 | Benmoussa | ............. | B64C 25/30 |
| | | | | 244/50 |

(Continued)

FOREIGN PATENT DOCUMENTS

| | | |
|---|---|---|
| CN | 106218872 A | 12/2016 |
| CN | 107867394 A | 4/2018 |
| CN | 112623201 A | 4/2021 |

(Continued)

OTHER PUBLICATIONS

International Search Report and Written Opinion for PCT/JP2022/040640 (ISA/JP) mailed Nov. 29, 2022 w/English translation (10 pages).

*Primary Examiner* — Tye William Abell
(74) *Attorney, Agent, or Firm* — Buchalter LLP

(57) ABSTRACT

A landing gear (1) includes a shock strut (2) having a cylinder (3) and a piston (4), and a wheel (5) supported on the piston. The shock strut has a steering mechanism (21) that turns the wheel about the strut axis (Z) together with the piston. A power source for the steering mechanism is an electric motor (6) having a rotor (61) and a stator (62), and the rotor and the stator are coaxial with the strut axis.

6 Claims, 3 Drawing Sheets

(56) References Cited

U.S. PATENT DOCUMENTS

2016/0236771 A1 *    8/2016   Necci ...................... B64C 25/62

FOREIGN PATENT DOCUMENTS

| JP | S50-42560 Y1 | 12/1975 | |
| JP | 2007-284054 A1 | 11/2007 | |
| JP | 2009-269596 A1 | 11/2009 | |
| JP | 5340072 B2 | 8/2013 | |
| JP | 5711187 B2 | 3/2015 | |
| WO | WO-2013072286 A1 * | 5/2013 | ............. B64C 25/50 |

* cited by examiner

LANDING GEAR FOR AIRCRAFT

CROSS REFERENCE TO RELATED APPLICATIONS

This application is a national stage application, filed under 35 U.S.C. § 371, of International Application No. PCT/JP2022/040640, filed Oct. 31, 2022, which international application claims further priority to and the benefit of Japanese Application No. 2022-005487, filed Jan. 18, 2022; the contents of both of which as are hereby incorporated by reference in their entireties.

BACKGROUND

Technical Field

The technique disclosed here relates to a landing gear for an aircraft.

Description of Related Art

Japanese Patent No. 5711187 describes a landing gear for an aircraft. This landing gear includes a steering mechanism. The steering mechanism has a collar, a link device, and a push-pull actuator. The actuator is, for example, a hydraulic actuator. A rod slides in a strut. A wheel is supported on the rod. The collar is rotatably supported on the lower end of the strut. The link device binds the collar and the rod such that the collar and the rod rotate integrally. The link device is a so-called torque link. In operation by a pilot for aircraft taxiing, the actuator rotates the collar. By rotation of the collar, the direction of the wheel changes via the link device and the rod.

Japanese Patent No. 5340072 describes a steering mechanism having a linear actuator. The actuator has a first hydraulic chamber and a second hydraulic chamber. When hydraulic fluid is supplied into the first hydraulic chamber, a rod of the actuator moves in a first direction, and the direction of a wheel changes accordingly. When hydraulic fluid is supplied into the second hydraulic chamber, the rod of the actuator moves in a second direction, and the direction of the wheel changes to the opposite direction accordingly.

Each of Japanese Unexamined Patent Publication Nos. 2007-284054 and 2009-269596 describes a steering mechanism having an electric motor. The electric motor is an actuator replaceable with a push-pull or linear actuator that uses hydraulic fluid as a power source.

In a landing gear of Japanese Unexamined Patent Publication No. 2007-284054, the electric motor is fixed to a side portion of a strut. A shaft of the electric motor is connected to a collar via a reduction gear including a plurality of gears. When the shaft of the electric motor rotates, the collar rotates via the reduction gear, and a torque link changes the direction of a wheel.

A landing gear of Japanese Unexamined Patent Publication No. 2009-269596 includes a wave gear device (Harmonic Drive (registered trademark)). The wave gear device is interposed between the electric motor and a collar. When a shaft of the electric motor fixed to the side portion of the strut rotates, the collar rotates via the wave gear device, and a torque link changes the direction of a wheel.

BRIEF SUMMARY

A conventional steering mechanism has a torque link. The torque link limits, due to the structure thereof, the direction of a wheel within a predetermined angle. In aircraft towing, a crew who operates a towing tractor needs to operate the towing tractor while paying attention to avoid the direction of the wheel from changing beyond the limit angle.

Even if the direction of the wheel reaches the limit angle due to an operation error, some measures need to be taken for a landing gear in order to avoid damage on the landing gear and an airframe.

The wheel direction limitation can be eliminated if a ground staff releases the torque link in aircraft towing. In this case, the ground staff needs to operate the torque link.

A gear is necessary for a steering mechanism having an electric motor. There is a probability that a foreign substance, such as pebbles, is caught in the gear. The caught foreign substance causes the steering mechanism stuck.

Further, in the conventional steering mechanism, the electric motor and a collar are constantly coupled to each other via a plurality of gears. In this structure, the wheel is unable to change its direction, for example, upon breakdown of the electric motor. For the conventional steering mechanism, a clutch mechanism that releases the electric motor and the collar from each other is necessary in order to change the direction of the wheel.

These problems of the conventional steering mechanism are caused due to a complicated power transmission mechanism between the power source and the wheel.

The technique disclosed here simplifies the structure of an aircraft landing gear including a steering mechanism.

The technique disclosed here relates to a landing gear for an aircraft. The landing gear includes a shock strut having a cylinder and a piston inserted into the cylinder and configured such that the piston is operable in the direction of a strut axis and is rotatable about the strut axis relative to the cylinder supported on an airframe, and a wheel supported on the piston, the shock strut has a steering mechanism that turns the wheel about the strut axis together with the piston, a power source for the steering mechanism is an electric motor having a rotor and a stator, and the rotor and the stator are coaxial with the strut axis.

According to this configuration, the electric motor which is the power source is coaxial with the strut axis. The piston rotates about the strut axis. Since the electric motor and the piston are coaxial with each other, a power transmission mechanism between the electric motor and the wheel is simple. As a result, various problems in the conventional steering mechanism can be solved.

The piston may form the rotor, and the cylinder may form the stator.

According to this configuration, the shock strut itself, which has the cylinder and the piston, forms the electric motor. When power is distributed to the electric motor, the piston which is the rotor rotates about the strut axis relative to the cylinder which is the stator. By rotation of the piston, the direction of the wheel supported on the piston changes. This new steering mechanism can be provided with no torque link and no gear mechanism.

For example, power distribution to the electric motor is stopped in aircraft towing so that the piston can freely rotate relative to the cylinder. Various problems due to the wheel direction limitation can be solved. Moreover, since no gear is present, no foreign substance is caught in the gear. Further, no clutch mechanism is necessary.

Since no torque link and gear mechanism are provided, the mass of the landing gear is reduced. Mass reduction is advantageous in aircraft energy saving.

A permanent magnet may be located in the piston, a coil may be located on the inner peripheral surface of the cylinder, and the permanent magnet and the coil may face each other in a state in which at least the wheel is on the ground and the piston is in the cylinder.

The piston operates in the direction of the strut axis relative to the cylinder. The relative positions of the permanent magnet and the coil change according to the amount of operation of the piston. In the landing gear with the above-described configuration, the permanent magnet and the coil face each other in a state in which at least the wheel is on the ground and the piston is in the cylinder. When power is distributed to the coil in this state, the piston including the permanent magnet rotates as the rotor about the strut axis. The direction of the wheel supported on the piston changes. The landing gear can change the direction of the wheel in aircraft taxiing.

The shock strut may have a shaft supported on the cylinder so as to rotate about the strut axis and protruding in a direction away from the piston from an end portion of the cylinder, the piston may be engaged with the shaft in the cylinder so as to relatively move in the direction of the strut axis and integrally rotate in a rotational direction about the strut axis, the electric motor may be located at the end portion of the cylinder, and the rotor may be connected to a protruding portion of the shaft.

In the landing gear with this configuration, the electric motor is located outside the cylinder. The rotor of the electric motor is connected to the shaft protruding from the end portion of the cylinder. When the rotor rotates, the shaft rotates about the strut axis.

The piston is engaged with the shaft in the cylinder. The piston is movable in the direction of the strut axis relative to the shaft. Moreover, the piston is operable in the direction of the strut axis relative to the cylinder. The shock strut can fulfill an impact absorption function.

The piston is engaged with the shaft so as to integrally rotate in the rotational direction about the strut axis. As described above, when the shaft rotates, the piston also rotates. When the piston rotates, the direction of the wheel supported on the piston changes.

The electric motor, the shaft, and the piston are coaxial with the strut axis, and are connected to each other. The landing gear includes no torque link and no gear mechanism. In the landing gear with this configuration, the power transmission mechanism between the electric motor and the wheel is also simple.

By stopping power distribution to the electric motor, the rotor of the electric motor can freely rotate. The shaft and the piston coaxially and directly connected to the rotor can freely rotate relative to the cylinder. The direction of the wheel is not limited, and therefore, various problems due to the wheel direction limitation can be solved. Moreover, since no gear is present, no foreign substance is caught in the gear. Further, no clutch mechanism is necessary.

Since no torque link and gear mechanism are provided, the mass of the landing gear is reduced.

The shaft may be a support tube that supports an orifice in the cylinder.

The support tube is used for both power transmission and orifice support, and therefore, the structure of the landing gear is simplified. Moreover, it is also advantageous in landing gear mass reduction.

The electric motor may be a stepper motor.

In the steering mechanism with the above-described configuration, the rotation angle of the rotor of the electric motor and the direction of the wheel are coincident with each other. The number of output pluses of a controller and the rotation angle of the rotor are proportional to each other, and therefore, the stepper motor is suitable as a power source in the steering mechanism with the above-described configuration. Moreover, no brake is necessary for the steering mechanism with the above-described configuration, and therefore, on this point, the stepper motor is also suitable as the power source.

The stepper motor can provide a relatively-great holding torque. The great holding torque is advantageous for holding the direction of the wheel in a certain direction. On this point, the stepper motor is also suitable as the power source in the steering mechanism with the above-described configuration.

Another landing gear disclosed here includes a shock strut having a cylinder and a piston inserted into the cylinder and configured such that the piston is operable in the direction of a strut axis and is rotatable about the strut axis relative to the cylinder supported on an airframe, and a wheel supported on the piston, the shock strut has a steering mechanism that turns the wheel about the strut axis together with the piston, a power source for the steering mechanism is an electric motor having a rotor and a stator, and the piston forms the rotor, and the cylinder forms the stator.

Still another landing gear disclosed here includes a shock strut having a cylinder and a piston inserted into the cylinder and configured such that the piston is operable in the direction of a strut axis and is rotatable about the strut axis relative to the cylinder supported on an airframe, and a wheel supported on the piston, the shock strut has a shaft supported on the cylinder so as to rotate about the strut axis and protruding in a direction away from the piston from an end portion of the cylinder, the piston is engaged with the shaft in the cylinder so as to relatively move in the direction of the strut axis and integrally rotate in a rotational direction about the strut axis, the shock strut has a steering mechanism that turns the wheel about the strut axis together with the piston, a power source for the steering mechanism is an electric motor located at the end portion of the cylinder and having a rotor and a stator, and the rotor is connected to a protruding portion of the shaft.

The above-described aircraft landing gear has the simple power transmission mechanism between the electric motor and the wheel, and therefore, various problems in the conventional steering mechanism can be solved.

DETAILED DESCRIPTION OF VARIOUS EMBODIMENTS

Hereinafter, an embodiment of a landing gear for an aircraft will be described with reference to the drawings. The landing gear described here is an example.

Figure 1:
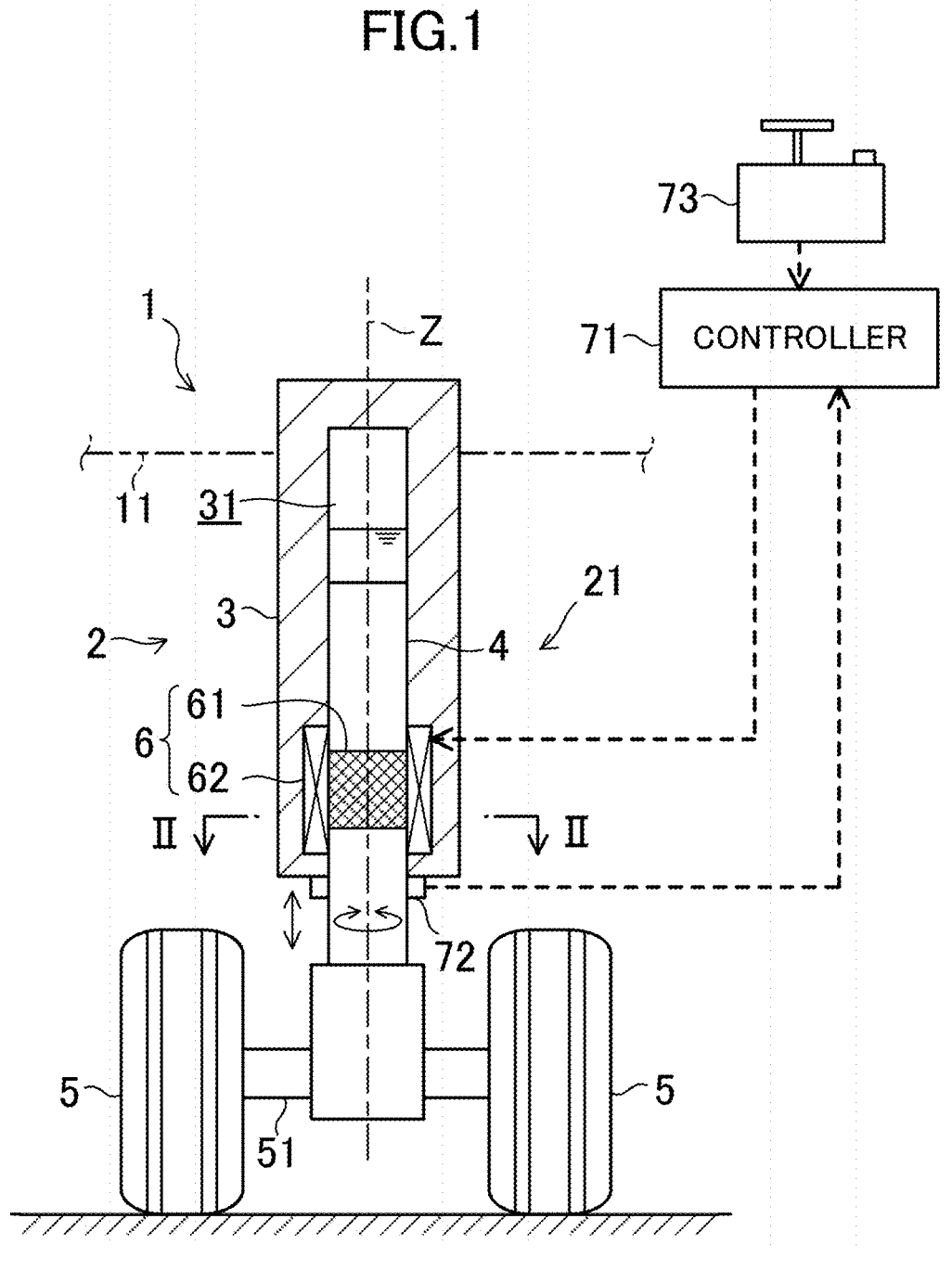
FIG. 1 shows a landing gear for an aircraft.

FIG. 1 shows a landing gear 1. The landing gear 1 includes a shock strut 2 and wheels 5, 5. The landing gear 1 is a nose landing gear of an aircraft. The shock strut 2 has a steering mechanism 21. The steering mechanism 21 changes the direction of the wheels 5, 5.

The shock strut 2 switches between a state of being housed in a bay of an airframe 11 and a state of being deployed from the bay. FIG. 1 shows a state in which the shock strut 2 is deployed and the wheels 5, 5 are on the ground. The strut axis Z of the shock strut 2 in the deployed state extends in an upper-lower direction. The weight of the airframe 11 acts on the shock strut 2 in this state.

The shock strut 2 has a cylinder 3 and a piston 4. The shock strut 2 is a so-called oleo shock strut. The cylinder 3 is substantially in a cylindrical shape. The axis of the cylinder 3 is coincident with the strut axis Z. A first end (i.e., upper end) of the cylinder 3 is closed. An upper end portion of the cylinder 3 is supported on the airframe 11 of the aircraft. A second end (i.e., lower end) of the cylinder 3 is opened.

The piston 4 is inserted into the cylinder 3 through the lower end thereof. The piston 4 is coaxial with the cylinder 3. The piston 4 is operable in the direction of the strut axis Z relative to the cylinder 3. Moreover, the piston 4 is rotatable about the strut axis Z relative to the cylinder 3 (see an arrow in FIG. 1).

An internal space 31 of the cylinder 3 formed by the cylinder 3 and the piston 4 changes its volume by operation of the piston 4. As shown in FIG. 1, in a state in which the weight of the airframe 11 acts on the shock strut 2, the piston 4 is in the cylinder 3. Hydraulic fluid and gas (e.g., nitrogen gas) are sealed in the internal space 31.

The wheels 5, 5 are located on both sides of the shock strut 2. The two wheels 5, 5 are supported on the lower end of the piston 4 via an axle 51.

As described above, the shock strut 2 has the steering mechanism 21. The steering mechanism 21 has an electric motor 6 which is a power source. In the landing gear 1, the electric motor 6 is formed by the shock strut 2 itself.

More specifically, a rotor 61 of the electric motor 6 is formed by the piston 4. A stator 62 of the electric motor 6 is formed by the cylinder 3. The rotor 61 and stator 62 of the electric motor 6 are coaxial with the strut axis Z.

The rotor 61 and the stator 62 face each other in a direction perpendicular to the strut axis Z in a state in which at least the wheels 5, 5 are on the ground and the piston 4 is in the cylinder 3. In other words, the position of the rotor 61 and the position of the stator 62 may be shifted from each other in the direction of the strut axis Z due to operation of the piston 4.

The rotor 61 is located in an intermediate portion of the piston 4 in the direction of the strut axis Z. The stator 62 is also located in an intermediate portion of the cylinder 3 in the direction of the strut axis Z. More specifically, in the configuration example of FIG. 1, the stator 62 is located at a position closer to the lower end of the cylinder 3. Note that the position of the stator 62 is not limited to that in the illustrated example. The stator 62 can be located at any position in the direction of the strut axis Z in the cylinder 3 as long as the stator 62 faces the rotor 61 of the piston 4. The position of the rotor 61 is not limited to that in the illustrated example. The rotor 61 can be located at any position in the direction of the strut axis Z in the piston 4 as long as the rotor 61 faces the stator 62 of the cylinder 3.

Here, in comparison between the length of the rotor 61 and the length of the stator 62 in the direction of the strut axis Z, the length of the stator 62 is longer than the length of the rotor 61. This configuration has an advantage that the rotor 61 and the stator 62 can face each other even when the amount of operation of the piston 4 changes due to a change in the weight of the airframe 11. Note that the length of the rotor 61 may be longer than the length of the stator 62.

Figure 2:
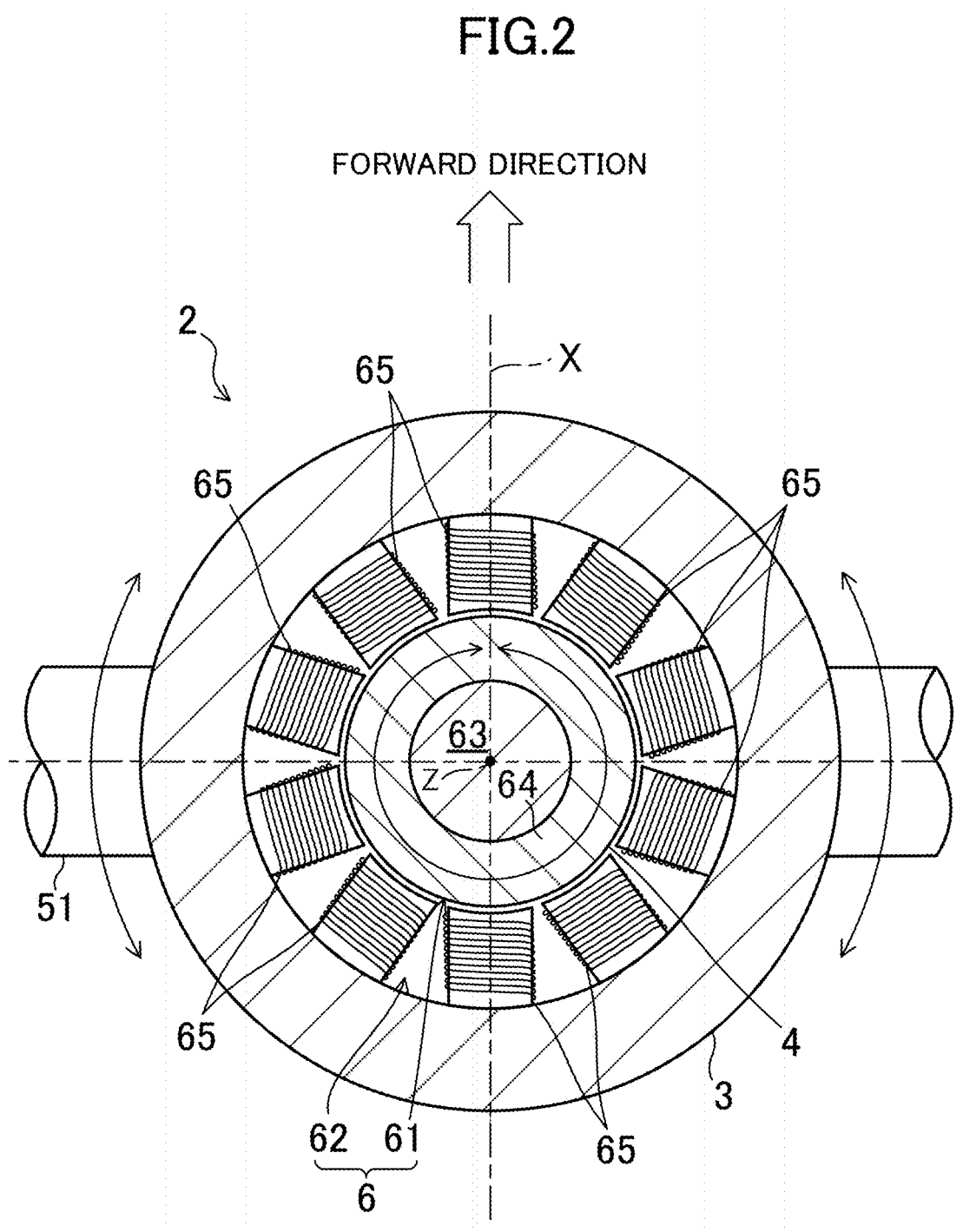
FIG. 2 shows a section taken along II-II line in FIG. 1.

FIG. 2 shows a sectional view at a position corresponding to the electric motor 6. The electric motor 6 is, for example, a stepper motor. FIG. 2 shows, as one example, a five-phase ten-coil hybrid stepper motor. The number of phases and the number of coils in the electric motor 6 can be set as necessary. The number of phases and the number of coils are not limited to a specific number of phases and a specific number of coils. Note that the type of the stepper motor is not limited to the hybrid type. The electric motor 6 may be a permanent magnet (PM) stepper motor or a variable reactance (VR) stepper motor. The electric motor 6 is not limited to the stepper motor. The electric motor 6 may be, for example, a servo motor. Various types of motors can be employed as the electric motor 6.

A permanent magnet 63 is disposed in a central portion of the piston 4. An iron core 64 (geared iron core although not shown in detail in FIG. 2) is provided so as to surround the permanent magnet 63. The permanent magnet 63 and the iron core 64 form the rotor 61.

Coils 65 are arranged in a circumferential direction on the inner peripheral surface of the cylinder 3. Although not shown in detail in FIG. 2, teeth corresponding to the geared iron core are provided in the tip end of an iron core of each coil 65. These coils 65 form the stator 62.

In a state in which at least the wheels 5, 5 are on the ground and the rotor 61 and the stator 62 face each other, a later-described controller 71 outputs pulsed waves to the stepper motor. Then, the rotor 61 and the piston 4 rotates about the strut axis Z in a positive direction (e.g., clockwise direction in FIG. 2) or a negative direction (e.g., counter-clockwise direction in FIG. 2) by an angle corresponding to the number of pulsed waves. With rotation of the piston 4, the angle of the axle 51 perpendicular to, for example, an airframe axis X changes (see arrows indicated by solid lines in FIG. 2). With the change in the angle of the axle 51, the direction of the wheels 5, 5 supported on the axle 51 changes. In this manner, in aircraft taxiing, the steering mechanism 21 can change the direction of the wheels 5, 5.

As shown in FIG. 1, the landing gear 1 includes a sensor 72. The sensor 72 is electrically connected to the controller 71. The sensor 72 outputs, to the controller 71, a position signal corresponding to the rotation angle of the piston 4. The controller 71 determines the direction of the wheels 5, 5 based on the signal from the sensor 72. In aircraft towing, power distribution to the electric motor 6 is stopped, and in this manner, the piston 4 and the wheels 5, 5 turn not under the control of the controller 71. The controller 71 determines the direction of the wheels 5, 5 based on the signal from the sensor 72 so that the controller 71 can control the direction of the wheels 5, 5 via the steering mechanism 21 in taxiing.

An operation device 73 is electrically connected to the controller 71. The operation device 73 is placed in a cockpit. In response to operation by a pilot, the operation device 73 outputs an operation signal to the controller 71. The controller 71 outputs, to the electric motor 6, a control signal (here, pulsed waves) corresponding to the operation signal. The rotor 61 of the electric motor 6 having received the control signal rotates about the strut axis Z, and accordingly, the direction of the wheels 5, 5 changes as described above.

The landing gear 1 is configured such that the electric motor 6 which is the power source for the steering mechanism 21 is formed by the piston 4 and cylinder 3 of the shock strut 2. As compared with a steering mechanism of a conventional landing gear, the structure of the landing gear 1 is significantly simplified.

Specifically, the steering mechanism 21 includes no torque link required for the conventional steering mechanism. The torque link mechanically limits the direction of the wheels 5, 5. On the other hand, in the steering mechanism 21 without the torque link, once power distribution to the electric motor 6 is stopped, the piston 4 can freely rotate relative to the cylinder 3 with no limitations. Thus, the landing gear 1 is free from various risks which may be caused in aircraft towing. Power distribution to the electric motor 6 can be stopped, for example, in such a manner that the pilot operates the operation device 73 in the cockpit. A work of a ground staff releasing the torque link is not necessary.

The steering mechanism 21 includes no gear mechanism forming a reduction gear. Thus, occurrence of a trouble due to a foreign substance, such as pebbles, caught in the gear can be avoided.

The torque link and the gear mechanism are omitted so that the mass of the landing gear 1 can be reduced as compared to the conventional landing gear.

In the steering mechanism 21 of the present configuration, the power source is directly connected to the piston 4. For the steering mechanism 21 of the present configuration, a clutch mechanism is not necessary.

In the steering mechanism 21 of the present configuration, the rotation angle of the rotor 61 of the electric motor 6 is coincident with the direction of the wheels 5, 5. The stepper motor has such a characteristic that the number of output pulses of the controller 71 is proportional to the rotation angle of the rotor 61. Since the electric motor 6 is the stepper motor, the steering mechanism 21 can accurately change the direction of the wheels 5, 5.

The steering mechanism 21 has a structure for which a brake of the electric motor 6 is not necessary.

The stepper motor can provide a relatively-great holding torque. The great holding torque is advantageous for holding the direction of the wheels 5, 5 in a certain direction.

In view of these points, the stepper motor is suitable as the power source for the steering mechanism 21. Note that the step angle (i.e., angle by which the rotor rotates with one pulsed wave) of the stepper motor may be set as necessary. The smaller the step angle is, the smoother the steering mechanism 21 can change the direction of the wheels 5, 5.

Variations

Figure 3:
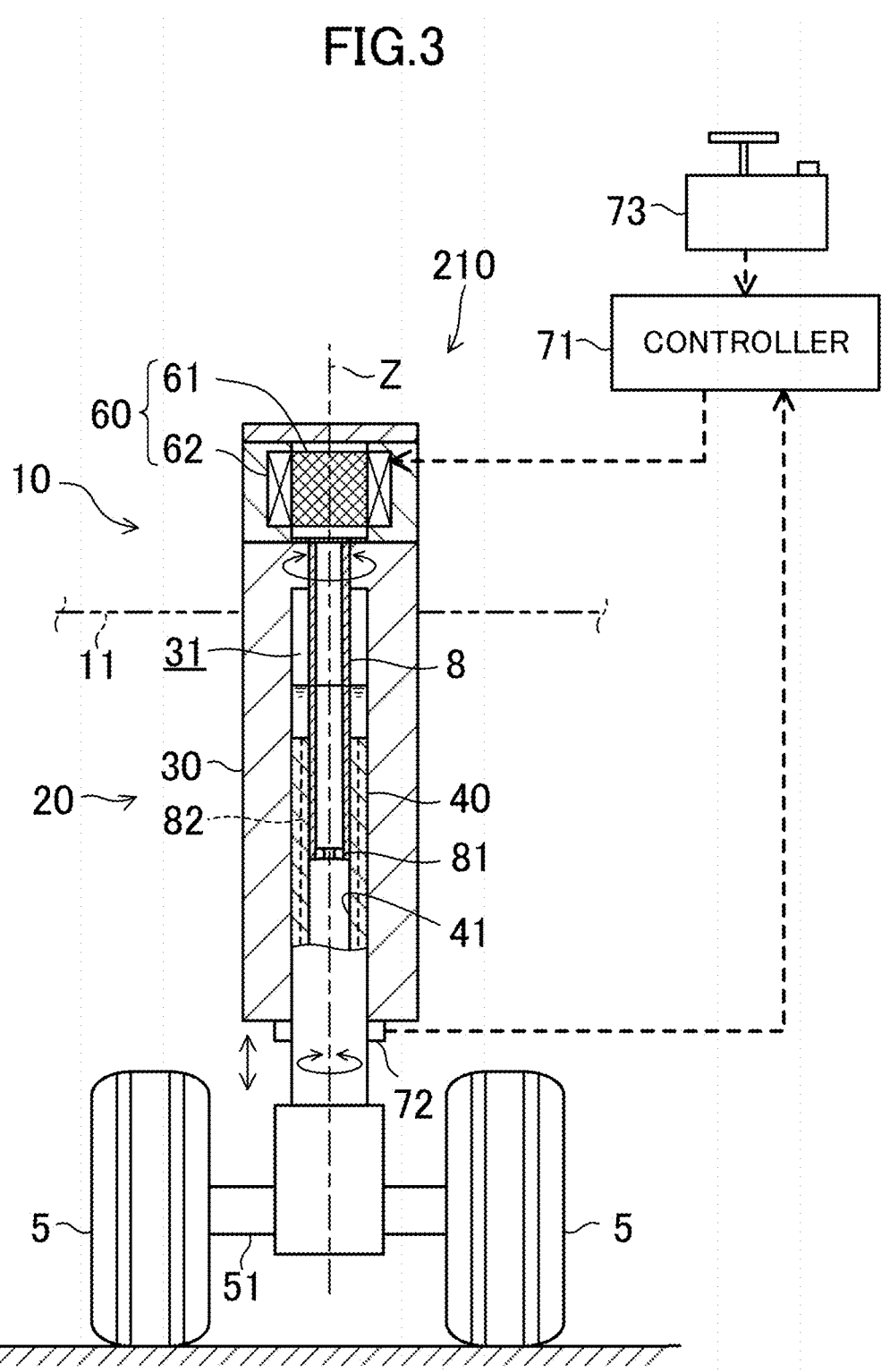
FIG. 3 shows a landing gear according to a variation.

FIG. 3 shows a variation of the landing gear. A landing gear 10 of FIG. 3 is different from the landing gear 1 of FIG. 1 in the position of an electric motor 60.

A shock strut 20 has a cylinder 30, a piston 40, a steering mechanism 210, and a support tube 8. The support tube 8 supports an orifice 81 in the internal space 31. By operation of the piston 40, the shock strut 20 absorbs impact by gas compression resistance and resistance when hydraulic fluid passes through the orifice 81.

The support tube 8 is in a cylindrical shape in this configuration example. The shape of the support tube 8 is not limited to the cylindrical shape. The support tube 8 is disposed coaxially with the strut axis Z in the cylinder 30. An end portion of the support tube 8 on the side opposite to the piston side protrudes outward through a first end (i.e., upper end) of the cylinder 30. The cylinder 30 supports the support tube 8 such that the support tube 8 is rotatable about the strut axis Z. The support tube 8 does not move in the direction of the strut axis Z relative to the cylinder 30. An end portion of the support tube 8 on the piston 40 side is located at an intermediate position in the cylinder 30.

The piston 40 is formed with a center hole 41. The center hole 41 is opened at the upper end of the piston 40. The support tube 8 is inserted into the center hole 41. The piston 40 and the support tube 8 are engaged with each other so as to move relative to each other in the direction of the strut axis Z and integrally rotate in a rotational direction about the strut axis Z. For example, a spline engagement portion 82 may be provided between the inner peripheral surface of the piston 40 and the outer peripheral surface of the support tube 8. Note that the engagement structure between the piston 40 and the support tube 8 is not limited to the spline engagement. Various publicly-known engagement structures can be employed.

A power source for the steering mechanism 210 is the electric motor 60. The electric motor 60 is located at an end portion of the cylinder 30 on the side opposite to the piston 40 side. The electric motor 60 is supported on the cylinder 30.

The electric motor 60 has the rotor 61 and the stator 62. The electric motor 60 may be a stepper motor as in the above-described landing gear 1. In the landing gear 10 of the present configuration, use of the stepper motor provides various advantages as described above to the landing gear 10. Note that various types of motor can be employed as the electric motor 60.

The rotor 61 of the electric motor 60 is connected to a protruding portion of the support tube 8. The electric motor 60 is directly connected to the support tube 8. When the rotor 61 rotates, the support tube 8 and the piston 40 rotate about the strut axis Z relative to the cylinder 30. The support tube 8 has not only a function of supporting the orifice 81, but also a function of transmitting power from the electric motor 60 to the piston 40. The support tube 8 forms part of the steering mechanism 210.

In taxiing, the operation device 73 outputs an operation signal to the controller 71 in response to operation by the pilot. The controller 71 outputs, to the electric motor 60, a control signal corresponding to the operation signal. The rotor 61 of the electric motor 60 having received the control signal rotates about the strut axis Z. With rotation of the rotor 61, the angle of the axle 51 changes via the support tube 8 and the piston 40. Then, the direction of the wheels 5, 5 changes. The sensor 72 outputs, to the controller 71, a position signal corresponding to the rotation angle of the piston 4.

In towing, power distribution to the electric motor 60 is stopped in response to operation by the pilot. The piston 40 can freely rotate relative to the cylinder 30 with no limitations. The landing gear 10 is free from various risks which may be caused in aircraft towing.

In the landing gear 10, the rotor 61 and stator 62 of the electric motor 60 are coaxial with the strut axis Z of the shock strut 20. The electric motor 60 is substantially directly connected to the piston 40. The structure of the landing gear 10 is simple.

As in the landing gear 1, the landing gear 10 also includes no torque link and no gear mechanism forming a reduction gear. Since these power transmission mechanisms are omitted, the landing gear 10 is free from various disadvantages as described above.

Since the electric motor 60 is located outside the shock strut 20, the maintainability of the electric motor 60 is improved.

Note that in the landing gear 10, the support tube 8 has both a function of supporting the orifice 81 and a function of transmitting power. Unlike this configuration, the shock strut 20 may have a shaft only for power transmission. A first end portion of the shaft is connected to the rotor 61 of the electric motor 60 outside the cylinder 30. A second end portion of the shaft is engaged with the piston 40 in the cylinder 30. The piston 40 is engaged with the shaft so as to relatively move in the direction of the strut axis Z and integrally rotate in a rotational direction about the strut axis Z. With this configuration, the shaft can transmit the power of the electric motor 60 to the piston 40. The electric motor 60 is substantially directly connected to the piston 40. When the rotor 61 of the electric motor 60 rotates, the piston 40 rotates about the strut axis Z, and the direction of the wheels 5, 5 changes.

The invention claimed is:

1. A landing gear for an aircraft, comprising:

a shock strut comprising a cylinder and a piston inserted into the cylinder and configured such that the piston is operable in a direction of a strut axis and is rotatable about the strut axis relative to the cylinder supported on an airframe; and a wheel supported on the piston, wherein the shock strut comprises a steering mechanism that turns the wheel about the strut axis together with the piston, a power source for the steering mechanism is an electric motor comprising a rotor and a stator, the rotor and the stator are coaxial with the strut axis, the shock strut comprises a shaft supported on the cylinder so as to rotate about the strut axis and protruding in a direction away from the piston from an end portion of the cylinder, the piston is engaged with the shaft in the cylinder so as to relatively move in the direction of the strut axis and integrally rotate in a rotational direction about the strut axis, the electric motor is located at the end portion of the cylinder, and the rotor is connected to a protruding portion of the shaft.

2. The landing gear of claim 1, wherein the shaft is a support tube that supports an orifice in the cylinder.

3. The landing gear of claim 1, wherein the electric motor is a stepper motor.

4. The landing gear of claim 1, wherein an end portion of the shaft passes through the end portion of the cylinder and protrudes in the direction away from the piston from an inside of the cylinder.

5. The landing gear of claim 4, wherein the stator faces the rotor outside the cylinder.

6. A landing gear for an aircraft, comprising:

a shock strut comprising a cylinder and a piston inserted into the cylinder and configured such that the piston is operable in a direction of a strut axis and is rotatable about the strut axis relative to the cylinder supported on an airframe; and a wheel supported on the piston, wherein the shock strut comprises a shaft supported on the cylinder so as to rotate about the strut axis and protruding in a direction away from the piston from an end portion of the cylinder, the piston is engaged with the shaft in the cylinder so as to relatively move in the direction of the strut axis and integrally rotate in a rotational direction about the strut axis, the shock strut comprises a steering mechanism that turns the wheel about the strut axis together with the piston, a power source for the steering mechanism is an electric motor located at the end portion of the cylinder and comprising a rotor and a stator, and the rotor is connected to a protruding portion of the shaft.

\* \* \* \* \*